(12) United States Patent
Bacon et al.

(10) Patent No.: US 7,596,569 B2
(45) Date of Patent: Sep. 29, 2009

(54) METHOD AND PROGRAM FOR SPACE-EFFICIENT REPRESENTATION OF OBJECTS IN A GARBAGE-COLLECTED SYSTEM

(75) Inventors: David Francis Bacon, Sleepy Hollow, NY (US); Perry Sze-Din Cheng, New City, NY (US); David Paul Grove, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 375 days.

(21) Appl. No.: 10/948,786

(22) Filed: Sep. 24, 2004

(65) Prior Publication Data

US 2006/0085433 A1 Apr. 20, 2006

(51) Int. Cl.
*G06F 7/00* (2006.01)
(52) U.S. Cl. ............ 707/100; 707/205; 707/206; 711/170; 711/173; 711/219
(58) Field of Classification Search ............ 707/100, 707/206; 711/125, 166, 170, 173
See application file for complete search history.

(56) References Cited

U.S. PATENT DOCUMENTS

| | | | | |
|---|---|---|---|---|
| 5,848,423 A * | 12/1998 | Ebrahim et al. | | 707/206 |
| 5,911,144 A * | 6/1999 | Schwartz et al. | | 707/206 |
| 6,081,665 A * | 6/2000 | Nilsen et al. | | 717/116 |
| 6,105,040 A * | 8/2000 | Agesen | | 707/206 |
| 6,321,240 B1 * | 11/2001 | Chilimbi et al. | | 707/206 |
| 6,728,852 B1 * | 4/2004 | Stoutamire | | 711/170 |
| 6,862,674 B2 * | 3/2005 | Dice et al. | | 711/170 |
| 7,010,555 B2 * | 3/2006 | Blandy et al. | | 707/206 |
| 7,085,789 B1 * | 8/2006 | Tarditi | | 707/206 |
| 2002/0087590 A1 * | 7/2002 | Bacon et al. | | 707/206 |
| 2002/0107880 A1 * | 8/2002 | Bacon | | 707/206 |
| 2003/0177152 A1 * | 9/2003 | Darnell | | 707/206 |
| 2005/0149589 A1 * | 7/2005 | Bacon et al. | | 707/206 |
| 2005/0198088 A1 * | 9/2005 | Subramoney et al. | | 707/206 |

* cited by examiner

*Primary Examiner*—Cam Y. Truong
*Assistant Examiner*—Hwa Shyue Jiunn
(74) *Attorney, Agent, or Firm*—Vazken Alexanian; McGinn IP Law Group, PLLC

(57) ABSTRACT

A system includes a processor for executing a collector program to perform a method (e.g., a method of collection). The method includes using an object model during a collection phase that is different than an object model used during program execution. The processor may also perform a method including assigning a hash code to at least some objects, and consulting a structure that maintains a mapping of objects to hashcode values to determine said hashcode for one of said objects. The processor may also perform a method including storing a class pointer and garbage collector state information in a single word, and accessing said class pointer by masking out non-class bits.

17 Claims, 14 Drawing Sheets

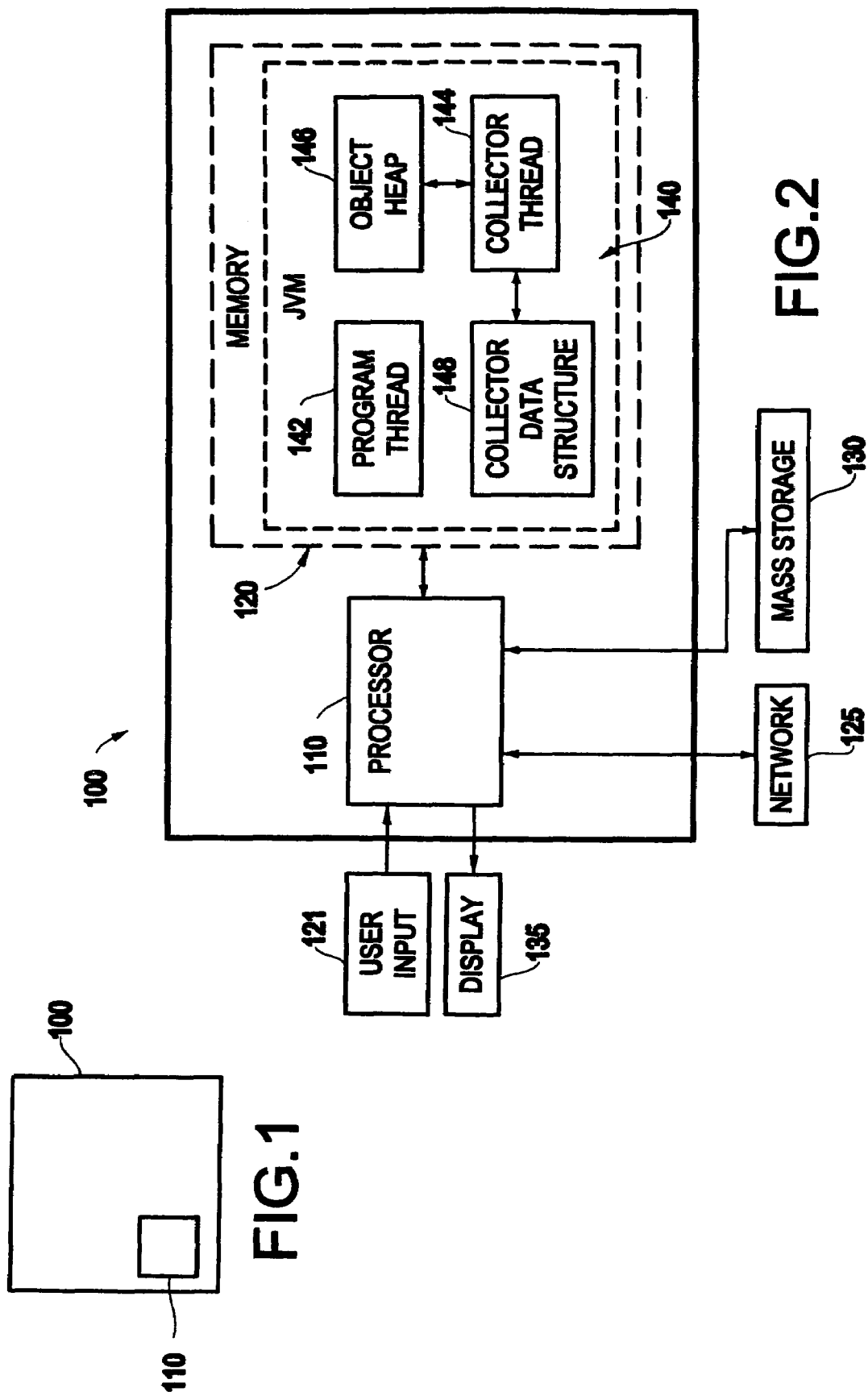

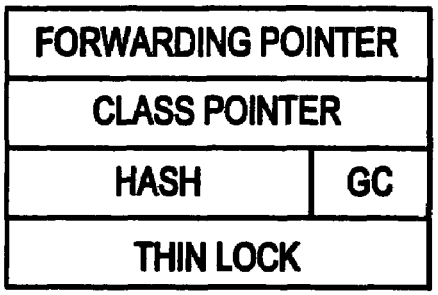
FIG.4A
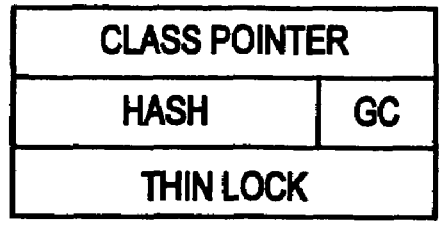
FIG.4B
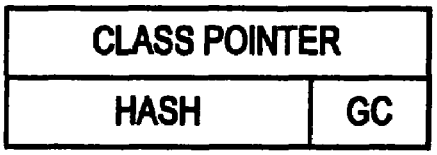
FIG.4C
FIG.4D
FIG.4E
| BENCHMARK | CLASSES | FUNCTION |
|---|---|---|
| Chess | 92 | Machine chess player |
| Crypto | 75 | Encrypt/decrypt (multiple algorithms) |
| kXML | 75 | XML parsing, DOM tree manipulation |
| Parallel | 71 | Parellel merge sort, matrix multiply |
| PNG | 70 | PNG image decoding |
| RegExp | 80 | Regular expression search |
FIG.5

| Config | Mfr. | Make | Model | CPU | Clock | L1 | L2 | RAM | OS | Version |
|---|---|---|---|---|---|---|---|---|---|---|
| IA32 | IBM | Thinkpad | T23 | Pentium III-M | 1.2GHz | 32KB | 512KB | 1GB | Windows 2000 | 5.00.2195 |
| ARM | Sharp | Zaurus | SL-6000 | XScale PXA-255 | 400 MHz | 32KB | — | 64MB | Embedix (Linux) | 2.4.18 |

FIG.6

| Benchmark | Allocation | | | Allocated (MB) | | | | Maximum Live (KB) | | | |
|---|---|---|---|---|---|---|---|---|---|---|---|
| | Objects | Obj/s | MB/s | 4 | 3 | 2 | 1 | 4 | 3 | 2 | 1 |
| Chess | 5,736,819 | 99,418 | 2.08 | 163.7 | 141.8 | 119.9 | 98.0 | 39 | 37 | 35 | 32 |
| Crypto | 674,218 | 18,894 | 1.12 | 48.1 | 45.4 | 42.8 | 40.2 | 71 | 70 | 69 | 68 |
| kXML | 6,200,624 | 115,074 | 3.41 | 231.1 | 207.4 | 183.7 | 160.0 | 286 | 261 | 241 | 224 |
| Parallel | 1,375,140 | 37,139 | 1.20 | 54.8 | 49.6 | 44.4 | 39.2 | 263 | 248 | 228 | 211 |
| PNG | 942,306 | 26,993 | 2.28 | 86.7 | 83.1 | 79.5 | 75.9 | 106 | 101 | 97 | 96 |
| RegExp | 120,032 | 2,604 | 0.14 | 7.3 | 6.8 | 6.4 | 5.9 | 45 | 41 | 35 | 31 |

FIG.7

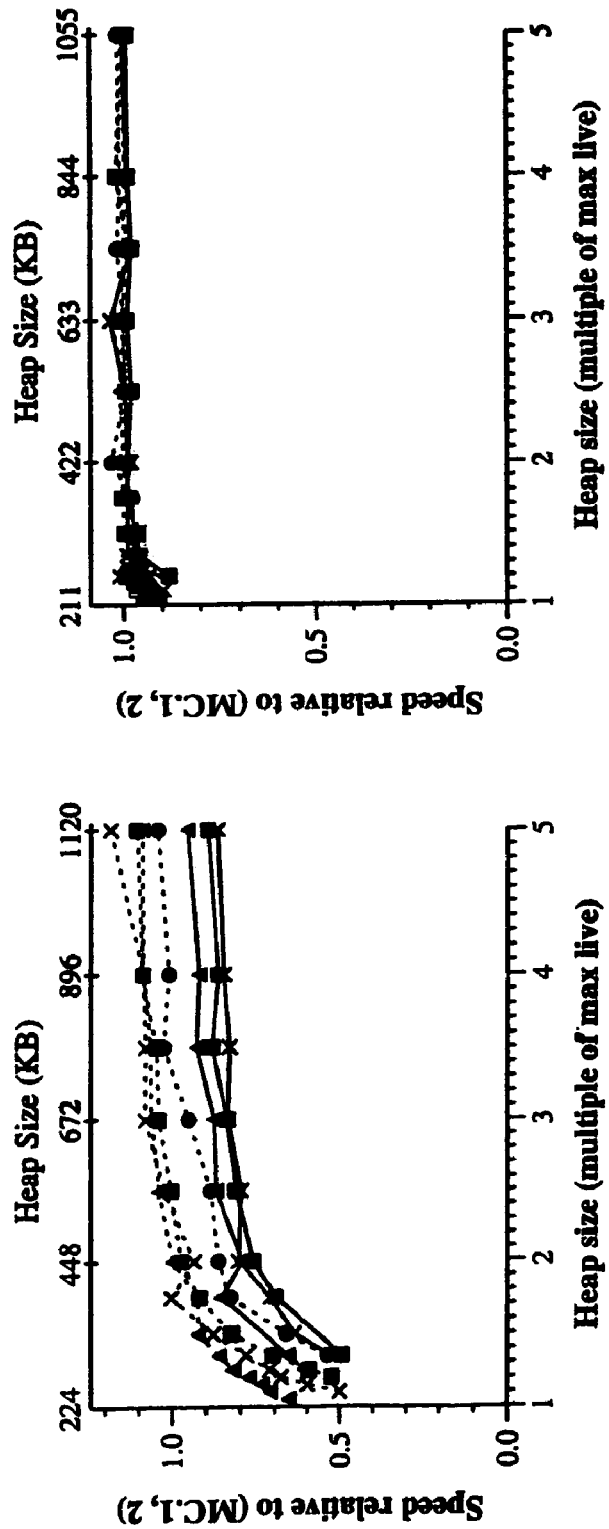
FIG.8C kXML
FIG.8D Parallel

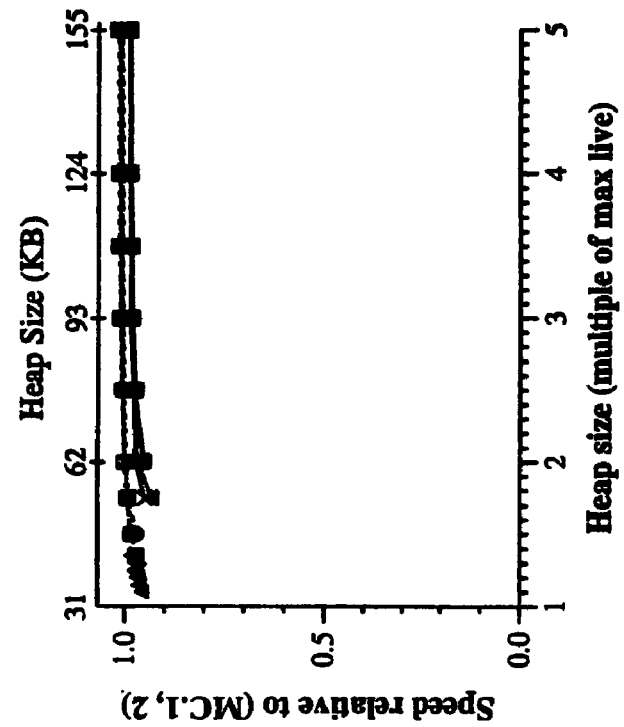
FIG. 8F RegExp
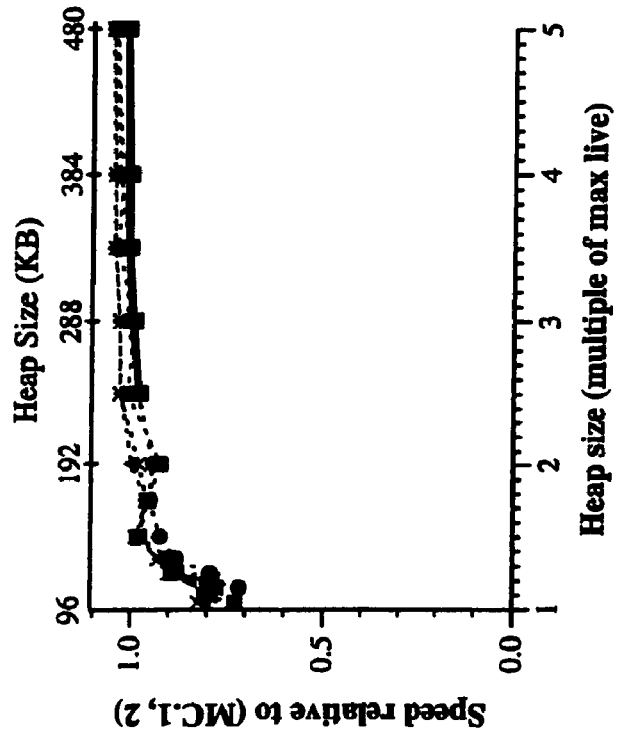
FIG. 8E PNG

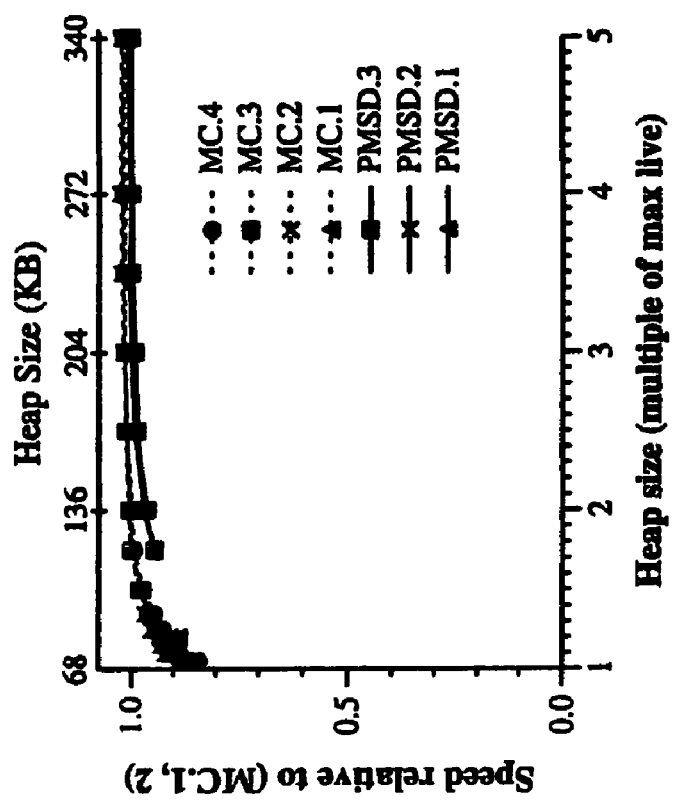
FIG.9B Crypto
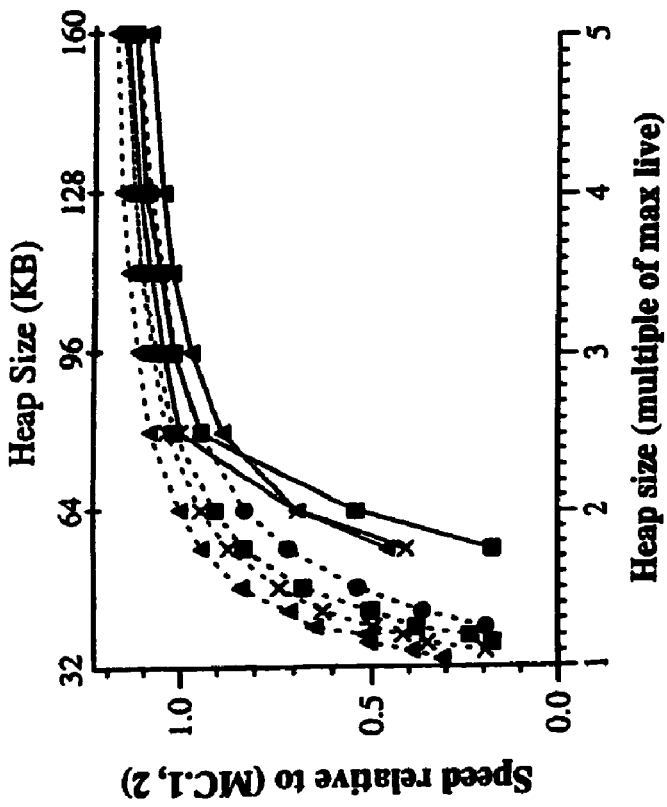
FIG.9A Chess

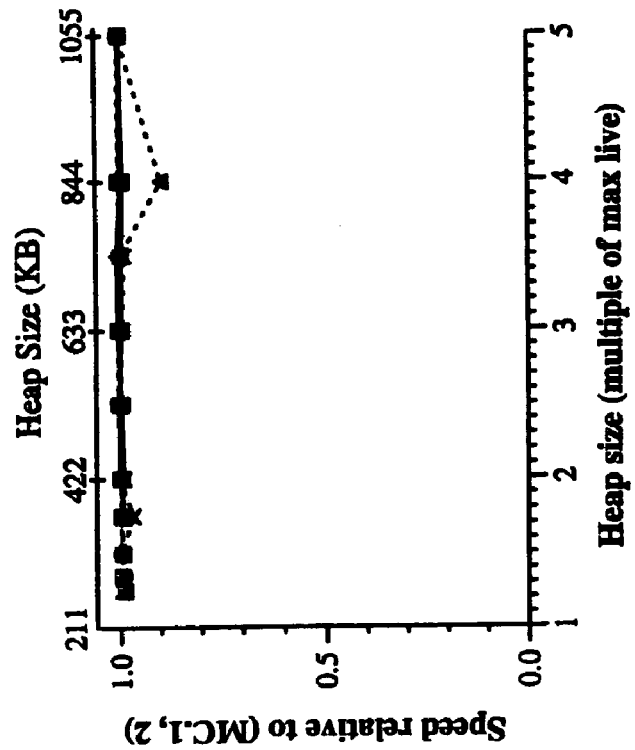
FIG. 9D Parallel
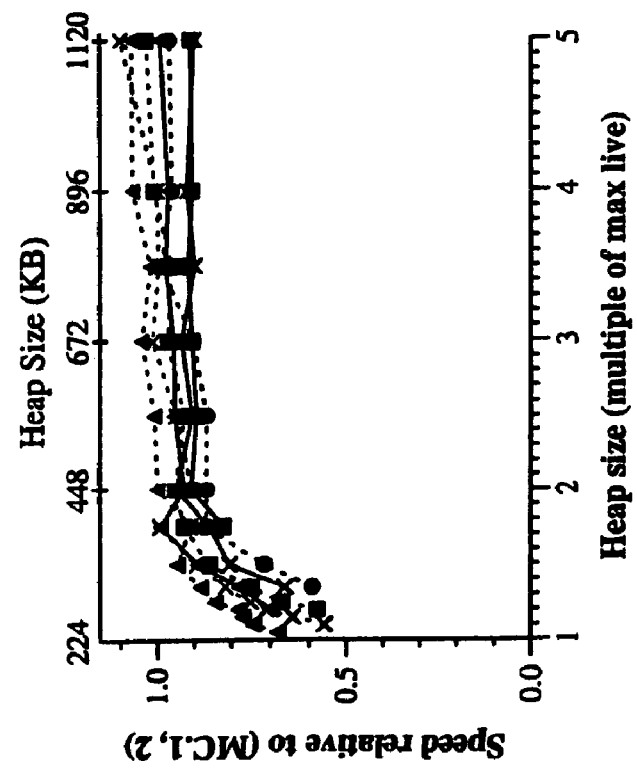
FIG. 9C kXML

METHOD AND PROGRAM FOR SPACE-EFFICIENT REPRESENTATION OF OBJECTS IN A GARBAGE-COLLECTED SYSTEM

BACKGROUND OF THE INVENTION

1. Field of the Invention

The present invention relates to a method and program for space-efficient representation of objects, and more particularly, a method and program for space-efficient representation of objects in a garbage-collected system.

2. Description of the Related Art

Embedded devices have long since become the most widely deployed computing platforms in the world, and the trend is continuing to accelerate. For such devices, including motes, smart cards, cellular phones, and handheld organizers, the flexibility to dynamically download new functionality is increasingly important. Often the downloaded software is not under the control of the maker of or service provider for the device.

Therefore, a premium is placed on reliability of the downloaded code—while consumers are regrettably accustomed to crashes on the part of personal computer operating systems, consumers are much less accepting when "necessary" devices like cellular phones cease to function. As a result, the Java computing platform is becoming steadily more attractive for embedded devices due to its safety properties, since arbitrary downloaded software can not compromise the operating system or other applications. A key contributor to these safety properties is garbage collection.

While some applications have real-time requirements, there are many which do not. Furthermore, the additional complexity, space, and time overheads necessarily associated with real-time collectors are in direct conflict with many of the other requirements imposed by memory-constrained embedded systems.

The requirements on garbage collectors in such embedded environments are:

Code Size: It is imperative that the virtual machine consume as little code space as possible. As a result, many typical methods for improving collector performance are inappropriate because of the resulting complexity and concomitant increase in code size;

Memory Overhead: The overhead due to collector metadata and memory fragmentation should be kept to an absolute minimum. As a result, semi-space copying collectors are not an option;

Compaction: Since many embedded applications tun continuously for extended periods of time, the collector must be able to perform memory compaction, both to avoid arbitrary space consumption due to fragmentation, and to enable the virtual machine to release memory resources to the operating system as needed;

Reliability: System failure is not acceptable. This places a premium on both simplicity and on strong enforcement of invariants within the collector;

Smooth Performance: The likelihood that the application will run in a very constricted memory space is much higher than in PC- or server-based virtual machines. Therefore, the collector's performance should degrade gracefully as memory is reduced; and Speed: Within the limits of the preceding requirements, the collector should be as fast as possible. Trading a small amount of space for a large improvement in time is acceptable for some, but not all, applications;

However, conventional systems and methods of garbage collection in such embedded environments experience several problems.

The tight memory requirements place a number of restrictions on the system which will be counter-intuitive to those working on desktop or server virtual machines. These issues arise both in the allocation strategy and in the garbage collection methodology.

First of all, inlining the allocation sequence is only done if the inlined code is (statically) shorter than the save/call/restore code sequence, since inlining would otherwise lead to significant code expansion.

Secondly, many popular free space organization schemes are unacceptable due to their high rate of fragmentation. Examples include binary buddy and systems that compose all objects out of a single small block size. The latter eliminate all external fragmentation at the expense of greatly increased internal fragmentation as well as increased access times, especially for array elements.

Other unfamiliar issues that arise in the embedded domain are the use of physical rather than virtually addressed memory, which makes a number of implementation techniques impossible; various types of segmented memory architectures, either due to the small architected word size of the processor, or to blocked allocation of non-virtual memory by the operating system; differing levels of memory performance (SRAM, DRAM, flash, etc.); and the requirement to reduce power consumption.

One author has evaluated the power consumption properties of different parts of memory in an embedded Java virtual machine (JVM), and discussed the collection strategies to minimize power consumption, particularly in a banked memory system where banks can be powered on and off individually. In subsequent work, the author used dynamic compression techniques to reduce the memory requirements of the application.

The author used two strategies: first, when heap space is exhausted, compression was performed on infrequently accessed objects. Second, allocating infrequently used fields of objects was avoided.

In the period from the early 1960's to the mid-1970's, Lisp systems ran with similar amounts of real memory as are available in today's smaller embedded environments, and there is therefore considerable related work from this time period.

However, significant amounts of this pioneering work was driven by the desire to reduce paging. The semi-space copying collectors were a response to this pressure.

Garbage collection in many early Lisp systems was considerably simplified by virtue of the fact that all memory consisted of CONS cells, which are of a uniform size. This assumption was also implicit in the design of Baker's Treadmill real-time collector.

Another author has advocated an approach to eliminating external fragmentation in systems with variable object sizes: there is a single block size (32 or 64 bytes) and all objects larger than that size are made up of multiple blocks which are not necessarily contiguous. Arrays are represented as trees.

There are two major problems with this approach: the first is that it simply trades external for internal fragmentation, which can easily reach 50%. Second, access to large objects becomes expensive—in particular, array element access, normally an indexed load instruction, becomes a tree walk operation. Performance overheads can therefore be very large.

A number of variations of region-based memory management have been tried. While automatically inferred regions can reduce the load on the garbage collector, they can not satisfactorily handle objects that have lifetimes that are not stack-like. Explicit regions significantly complicate the programming model, lead to brittle code, and expose more runtime errors. We have shown that garbage collection can run in constrained memory with good performance, obviating many of the reasons for using regions.

Still another author has claimed that fragmentation is not a "real world" problem and that it is feasible to build non-compacting collectors. However, the authors's measurements are for unrealistically short-lived programs.

Much of the work on real-time garbage collection overlaps in its concerns with pure embedded collection, although the real-time concerns often lead to reduced throughput and increased complexity.

For real-time or embedded systems, it is very important to be able to know the memory requirements of a given application. One approach is to analyze the live memory requirements using a combination of programmer annotation of pointer types and recursion depths, and automatic analysis.

SUMMARY OF THE INVENTION

In view of the foregoing and other problems, disadvantages, and drawbacks of the aforementioned systems and methods, it is a purpose of the exemplary aspects of the present invention to provide a system, method and program for representation of objects which is more space-efficient than conventional systems, methods and programs.

The exemplary aspects of the present invention includes a system including a processor for executing a collector program to perform a method (e.g., a method of collection). The method includes using an object model during a collection phase that is different than an object model used during program execution.

During the collection phase, a portion of an object header may be encoded to enable a forwarding pointer to be stored in the object header. Further, a class pointer may be encoded during a portion of the collection phase and a space which is made available in a class pointer word may be used to store an encoded forwarding pointer.

In addition, the class pointer may be encoded as an index. Specifically, the class pointer may be encoded as an index into a class page table.

The system may also include a memory accessible by the processor. The memory may be divided into pages. Further, a relocation address of a first live object in each page of the memory may be stored in a relocation base table (RBT).

Further, available header space may be used for relocation offset. In addition, the relocation address may be determined by using a shifted original address of the object as an index into the RBT, from which a relocation base address is loaded, the relocation base address being a sum of a base address an the offset.

The processor may also execute a program to perform a method including assigning a hash code to at least some objects, and consulting a structure that maintains a mapping of objects to hashcode values to determine said hashcode for one of said objects. Consulting may be performed when a hashCode( ) method for the one of the objects is called.

Further, the structure maps an address for the one of the objects to a hashcode value for the one of the objects. The structure may include a mashtable in which a hash value may be computed based on a current address for the object in storage, the hash value being a hash index of the object into the mashtable, If an entry is found whose key is the current address of the object, the corresponding value in the mashtable may be returned as the hashcode for the object, and if no entry for the object is found in the mashtable, a key/value pair may be inserted where the key and the value are a current address for the object.

Further (e.g., after an object is determined to be live, and before any object is relocated) the collection may be performed on the mashtable such that a reference to a dead object is removed, and a key field for a moved object may be updated to a new address and may be relocated in the mashtable based on the new mashcode.

Further, no bits in a header of an object encode a hashcode state for the object. In addition, one bit in the header of the object may encode whether a mashtable entry exists for the object.

The processor may also execute a program to perform a method including storing a class pointer and garbage collector state information in a single word, and accessing said class pointer by masking out non-class bits. Garbage collector state bits may be represented such that the garbage collector state bits comprise 0 when garbage collection is not in progress. Further, the class pointer may be accessed without masking when garbage collection is off (e.g., because the non-class bits comprise 0 when the system is in that state).

Another aspect of the present invention is directed to a method (e.g., a method of garbage collection) which includes using an object model during a collection phase that is different than an object model used during a program execution. In another aspect, the method includes assigning a hash code to at least some objects, and consulting a structure that maintains a mapping of objects to hashcode values to determine the hashcode for one of the objects. In another aspect, the method includes storing a class pointer and garbage collector state information in a single word, and accessing the class pointer by masking out non-class bits.

Another aspect of the present invention is directed to a programmable storage medium tangibly embodying a program of machine-readable instructions executable by a digital processing apparatus to perform a method of collection. The method includes using an object model during a collection phase that is different than an object model used during a program execution. In another aspect, the method includes assigning a hash code to at least some objects, and consulting a structure that maintains a mapping of objects to hashcode values to determine the hashcode for one of the objects. In another aspect, the method includes storing a class pointer and garbage collector state information in a single word, and accessing the class pointer by masking out non-class bits.

With its unique and novel features, the present invention provides a system, method and program for representation of objects which is more space-efficient than conventional systems.

BRIEF DESCRIPTION OF THE DRAWINGS

The foregoing and other objects, aspects and advantages will be better understood from the following detailed description of the embodiments of the invention with reference to the drawings, in which:

FIG. 1 illustrates a system 100 (e.g., an embedded system) which includes a processor 110 for executing a program to perform a method of collection, according to the exemplary aspects of the present invention;

FIG. 2 illustrates an exemplary software environment for the system 100, according to the exemplary aspects of the present invention;

FIGS. 4A-4E illustrate object models, requiring from 4 down to 1 word per object, according to the exemplary aspects of the present invention;

FIG. 5 provides table illustrating programs in the Embedded Microprocessor Benchmark Consortium (EEMBC) Java GrinderBench suite;

FIG. 6 illustrates details of the measurement configurations for measurements performed by the inventors;

FIG. 7 which provides a table illustrating the effect of header compression on heap consumption for header sizes from 4 to 1 words, according to the exemplary aspects of the present invention;

FIGS. 8A-8F illustrate end-to-end execution time (ARM) for measurements performed by the inventors;

FIGS. 9A-9F illustrate the end-to-end execution time for IA32 for measurements performed by the inventors;

DETAILED DESCRIPTION OF THE EXEMPLARY EMBODIMENTS OF THE INVENTION

Figure 3:
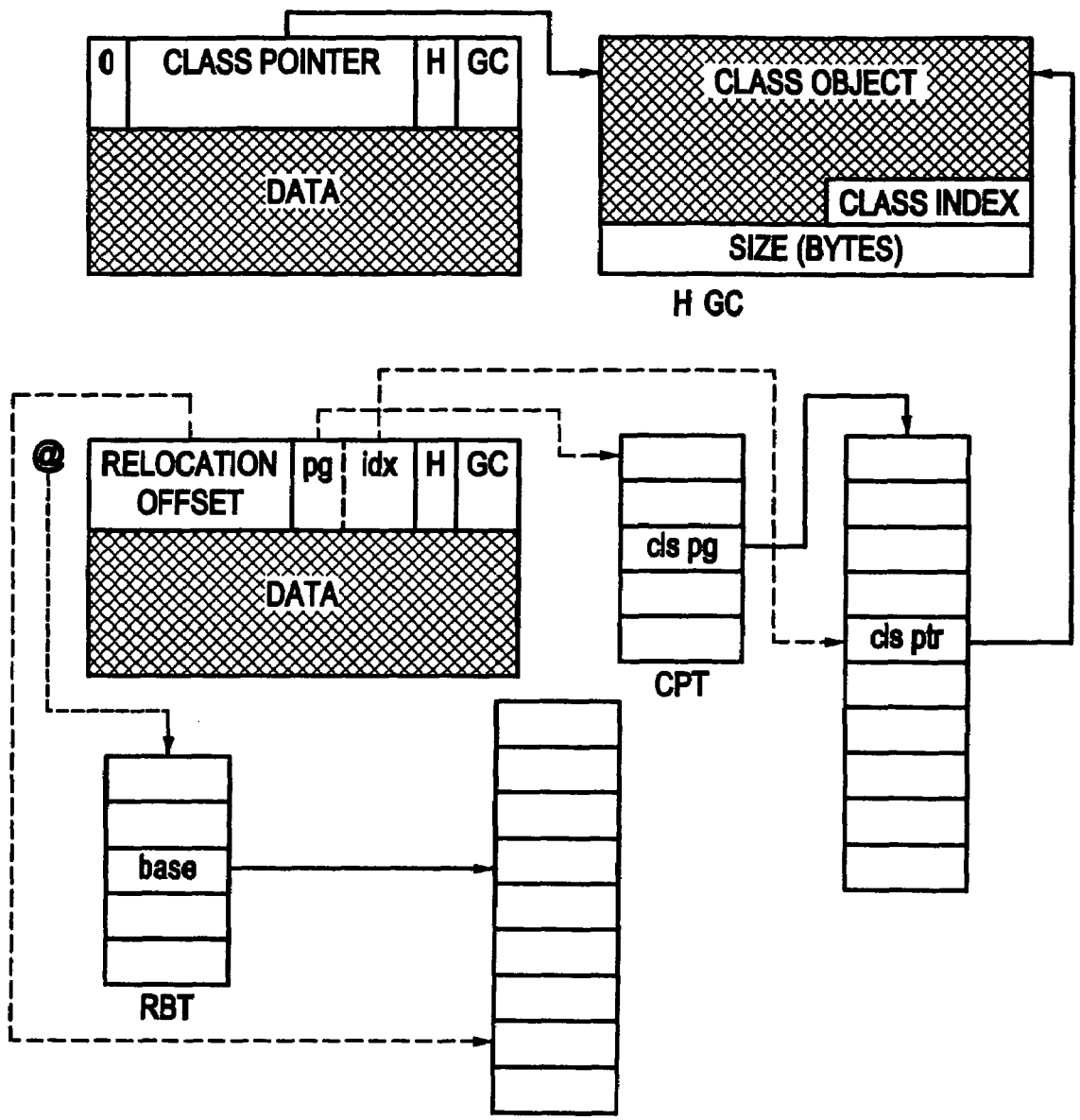
FIG. 3 illustrates a representation of ordinary objects and objects with compressed headers (e.g., during collection)
Figure 8B:
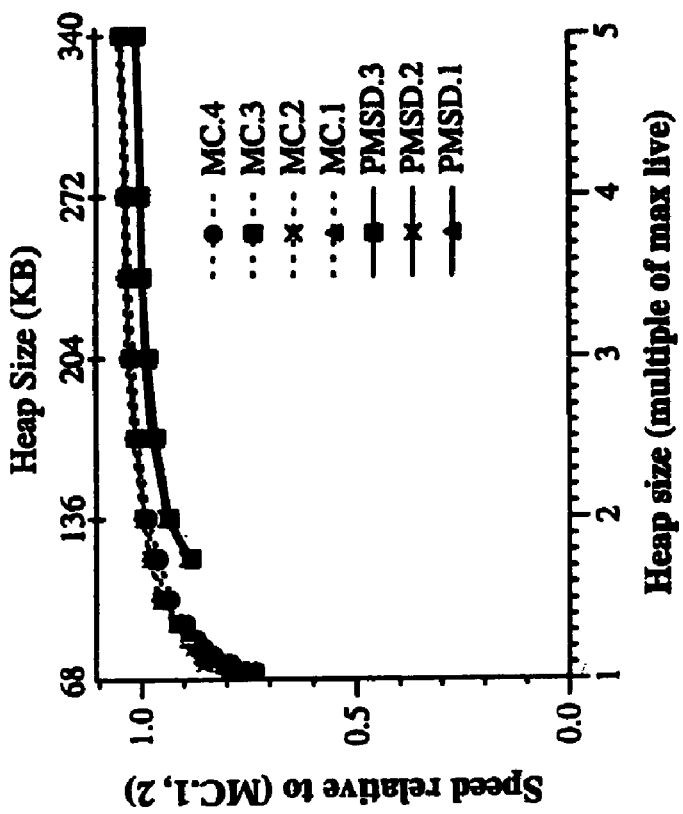
Figure 8A:
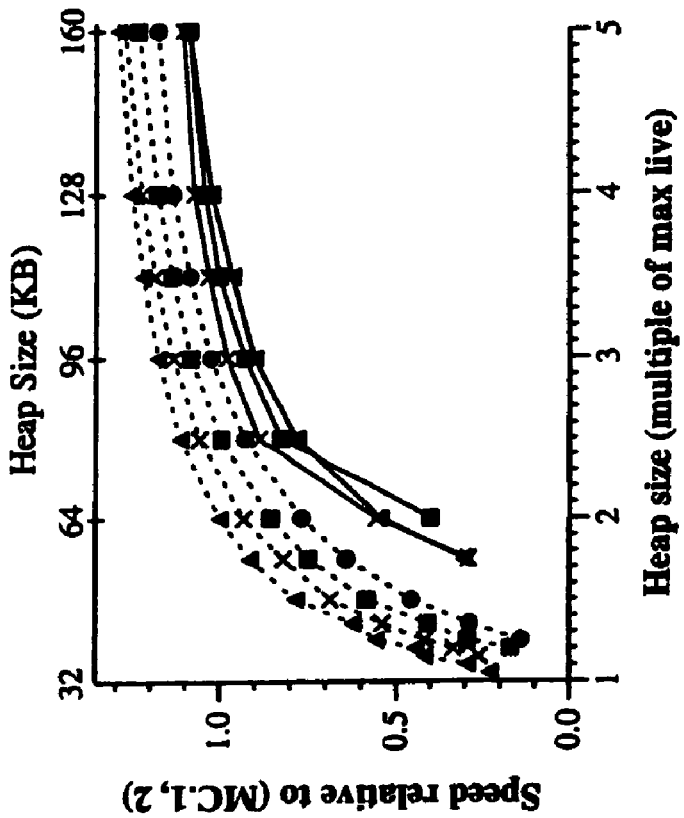
Figure 9F:
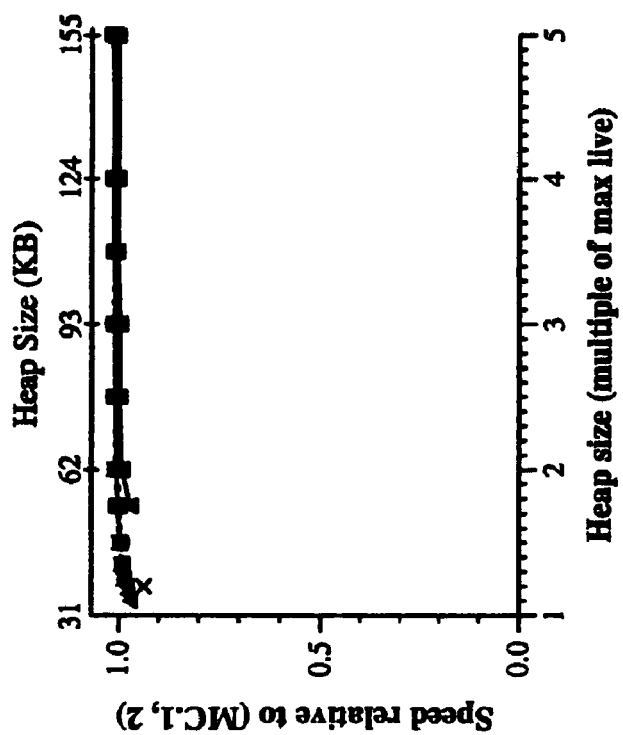
Figure 9E:
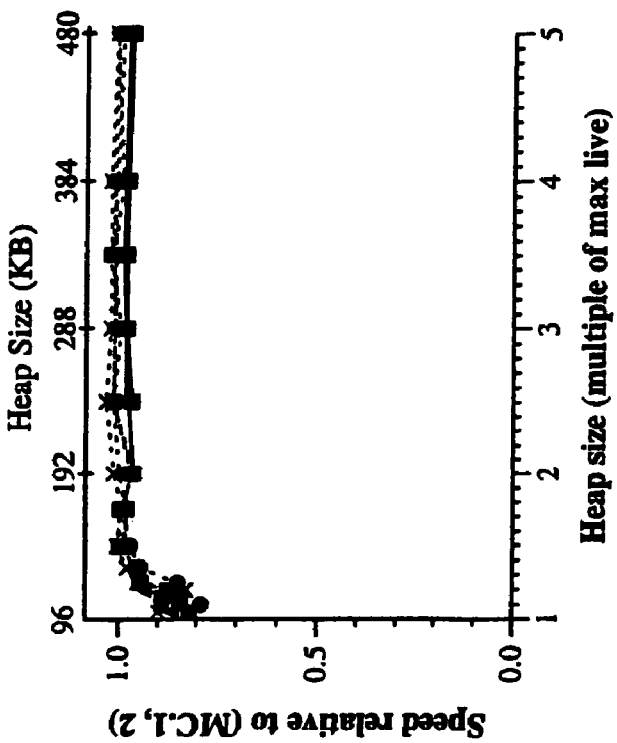

Referring now to the drawings, FIG. 1 illustrates an system 100 which includes a processor 110 for executing a collector program to perform a method (e.g., a method of collection). The method includes using an object model during a collection phase that is different than an object model used during program execution.

The processor 110 may also execute a program to perform a method including assigning a hash code to at least some objects, and consulting a structure that maintains a mapping of objects to hashcode values to determine said hashcode for one of said objects. Consulting may be performed when a hashCode( ) method for the one of the objects is called.

The processor 110 may also execute a program to perform a method including storing a class pointer and garbage collector state information in a single word, and accessing said class pointer by masking out non-class bits. Garbage collector state bits may be represented such that the garbage collector state bits comprise 0 when garbage collection is not in progress. Further, the class pointer may be accessed without masking when garbage collection is off (e.g., because the non-class bits comprise 0 when the system is in that state).

FIG. 2 illustrates an exemplary software environment for the system 100 according to the exemplary aspects of the present invention. The processor 110 may be coupled to a memory 120 as well as to several inputs and outputs. Further, a user may input data (e.g., information) to the system 100 (e.g., processor 110) by using an input device 121 such as a keypad. Information may be transmitted (e.g., wirelessly transmitted) between the system 100 and other systems via network 125 (e.g., a local area network (LAN), Internet, etc.).

Information may also be transmitted (e.g., wirelessly transmitted) by the system 100 (e.g., processor 110) to and from mass storage 130 (e.g., database). The processor 110 may also output display data to a display 135.

The memory 120 may include, for example, a Java Virtual Machine (JVM) execution module 140 which is configured to execute program code on the processor 110, e.g., one or more program threads 142, as well as a collector thread 144 that is used to deallocate unused data stored in an object heap 146. Collector thread 144 may also utilize a plurality of data structures 148 during its operation.

The execution module 140 may be resident as a component of the operating system of system 100, or in the alternative, may be implemented as a separate application that executes on top of an operating system. Furthermore, any of execution module 140, program thread 142, collector thread 144, object heap 146 and collector data structures 148 may, at different times, be resident in whole or in part in any of memory 120, mass storage 130, network 125, or within registers and/or caches in processor 110.

Security concerns on embedded devices like cellular phones make Java an extremely attractive technology for providing third-party and user-downloadable functionality. However, collector programs (e.g., "garbage collectors" or "collectors") have typically required several times the maximum live data set size (which is the minimum possible heap size) in order to run well. In addition, the size of the virtual machine (read only memory (ROM)) image and the size of the collector's data structures (metadata) have not been a concern for server- or workstation-oriented collectors.

The inventors have implemented two different collectors specifically designed to operate well on embedded systems (e.g., small embedded devices). The inventors have also developed a number of algorithmic improvements and compression techniques that allow the elimination (e.g., substantial elimination) of all of the per-object overhead that the virtual machine and the garbage collector require. These optimizations and present measurements of the Java embedded benchmarks (EEMBC) of the inventors' implementations on both an IA32 laptop and an ARM-based PDA are described hereinbelow.

The inventors have implemented the present invention in collectors in which, for applications with low to moderate allocation rates, the optimized collector running on the ARM was able to achieve 85% of peak performance with only 1.05 to 1.3 times the absolute minimum heap size. For applications with high allocation rates, the collector achieved 85% of peak performance with 1.75 to 2.5 times the minimum heap size. The collector code took up 40 KB of ROM, and collector metadata overhead was almost completely eliminated, consuming only 0.4% of the heap.

Specifically, the inventors have constructed garbage collectors (e.g., non-real-time garbage collectors) for IBM's Java 2 Micro Edition (J2ME) virtual machine for the IBM WebSphere Micro Environment. Several variants of two "microcollectors" were implemented by the inventors and several different object models for J2ME were implemented in order to explore the design space of collectors that meet the requirements of garbage collectors in embedded systems.

While some implementation details are specific to a virtual machine architecture, the techniques present hereinbelow are applicable to most virtual machines. Specifically, some of the object model optimizations are specific to Java, but many are applicable to other garbage-collected languages.

Other unfamiliar issues that arise in the embedded domain are the use of physical rather than virtually addressed memory, which makes a number of implementation techniques impossible; various types of segmented memory architectures, either due to the small architected word size of the processor, or to blocked allocation of non-virtual memory by the operating system; differing levels of memory performance (SRAM, DRAM, flash, etc.); and the requirement to reduce power consumption.

The Mark-Compact Collector

Embedded systems have tight memory requirements and applications are often long-running. Therefore, it is important (e.g., absolutely essential) to be able to place a tight bound on memory loss due to fragmentation. This can not be done without compaction (or some other technique which moves objects).

The present invention may include a mark-compact collector which is based on the original mark-compact algorithm. The collector allocates linearly until the heap is exhausted and then compacts by sliding objects "to the left" (towards low memory). It therefore tends to preserve (or even improve) locality, and fragmentation is eliminated completely on every collection.

As in a semi-space copying collector, allocation is very fast: a simple bump pointer and range check. This allocation sequence has the advantage that it is short enough to consider inlining, although in the inventors' JVM, a hand-coded, but out-of-line, allocation sequence was used.

However, note that on platforms that present a segmented, nonvirtual memory interface (such as PalmOS 7), fragmentation at the end of segments becomes an issue that must be addressed.

Compaction and its Optimizations

Referring again to the drawings, FIG. 3 illustrates a representation of ordinary objects and objects with compressed headers (e.g., during collection).

Specifically, in the exemplary aspects of the present invention, the collector program (e.g., a sliding compaction algorithm) may require four (4) phases:

1. Mark: Traverse the object graph beginning at the roots, marking each object encountered as live;
2. Sweep: Scan memory sequentially, looking for dead objects and coalescing them into contiguous free chunks. Compute the new address for each object and store a forwarding pointer in the object;
3. Forward: Change all object pointers to point to the forwarded value as determined by the Sweep phase; and
4. Compact: From left to right, move objects to their new locations.

Typically, the Sweep phase is the most expensive since it needs to scan all of memory, while the other phases are proportional to the live data. The Mark and Forward phases are typically similar in cost, since they both essentially traverse the live objects and examine each field. The Compact phase is the fastest since it does not look inside objects, but just copies them a word at a time. Although the Forward and Compact phases scan the heap linearly, their costs are proportional to only the live objects since the previous Sweep phase has coalesced adjacent dead objects into contiguous free chunks.

It is in fact fairly straightforward to reduce by one the number of collection phases, a result which the inventors were not able to find in the published literature. The result is, therefore, presented here.

The inventors have observed that during the sweep phase, when an object is encountered, the forwarded addresses of objects to its left have already been computed. Therefore, each pointer in the object may be examined in turn, and if the pointer points to the left, the pointer is replaced with the forwarded version stored with the destination object. If it points to the right, it is left unchanged.

The Forward phase can, thus, be omitted entirely. The Compaction phase is extended so that before moving an object (by sliding it to the left) each pointer is examined in turn, and if the pointer points to the right, it is known (a) that it was not forwarded in the previous pass, and (b) that the forwarding pointer is still available. Therefore, exactly those pointers are forwarded.

The result is an algorithm that traverses the heap 3 times instead of 4, which would seem to result in a lower load on the memory subsystem. However, the inventors have found in practice that it makes almost no difference, and in fact tends to slightly slow down some programs. The reason is that there are now two passes that examine pointers in each object for forwarding. To do this they must look at the target of the pointer, which results in a random access pattern. Thus, it appears that two sequential passes over live memory cost about the same as one pass with random access. The reason is that the pointers in each object are looked through an extra time, and this is an expensive operation. By having a separate Forward phase, although the live objects are scanned an additional time, scanning the pointers in the object a second time is avoided. Since there are fewer objects than pointers, the extra phase wins.

Therefore, the inventors did not further consider this optimization, although it may give important performance benefits in systems with different languages, memory technologies, etc.

Forwarding Pointer Elimination

The compaction algorithm may require an extra forwarding pointer at the beginning of every object since, unlike a copying collector, the forwarding pointer cannot overlay any data or header fields. Due to the memory-constrained nature of embedded devices, it is desirable to avoid paying this space cost, without requiring any extra passes over the heap.

The present invention may avoid the space cost for compaction by encoding the class pointer during the compaction phase, and then using the space made available in the class pointer word to store a compressed forwarding pointer.

Instead of a class pointer, the present invention may use a class index (e.g., a 14-bit class index, allowing for 16,383 classes). To avoid the need for a large class index table (which would consume 64 KB), the class table may be divided into pages (e.g., 1 KB pages, each containing 256 class pointers). The class page table (CPT) contains pointers to the class pages. The CPT only requires 64 entries or 256 bytes. The loss of space due to internal fragmentation in the last class page may be at most 1 KB, and only 512 bytes on average.

The class index (e.g., the 14-bit class index) may be subdivided into a 6-bit class page table index and an 8-bit class page offset. To reduce the overhead of CPT lookups, a single-element cache of the last lookup value may be used.

Each class object should also contain its 14-bit class index (stored in a half-word). Thus, the total overhead is 1.5 words per class plus 256 bytes plus 0-1020 bytes lost to internal fragmentation.

Further, class pointers are converted into class indices during the Forward phase, and are converted back into class pointers during the Compact phase.

The reason that traditional compaction requires an extra word per object is that a relocation address is computed for each object. Since space in the header word has been freed by encoding the class pointer with an index, a sub-word is available to represent the relocation address. However, that relocation address should be encoded as well, since there is not enough space for a full-width relocation pointer.

The inventors observed that sliding compaction has the property that the relocation addresses of successive objects in memory increase monotonically. Therefore, for any region of memory of size s, as long as objects do not increase in size during relocation, the relocation address can be represented as the relocation address of the first object in the region plus an offset in the range [0, s).

There are two potential sources of object expansion. One is the additional word associated with the hash code, which was eliminated with the use of the hash nursery. The other includes alignment requirements: an arbitrary number of objects may have been correctly aligned with no padding necessary at their original addresses, whereas their target addresses are misaligned. This can lead to a relocated region actually growing in size.

However, there is always a schedule of relocations that eliminates such mis-alignment. In particular, it is sufficient to align the first object in the page to the same alignment that it had in its original location. This is always possible, since if there is no space left to align it, it should be able to be placed in exactly the same relative position. Preserving the alignment of the first object may guarantee that there will be no subsequent growth within the memory region due to alignment changes.

Therefore, the memory may be divided into pages (e.g., 128 KB pages), and a relocation base table (RBT) which contains the relocation address of the first live object is in each page. Then, 15 bits in the header word (now available due to class pointer encoding) may be used for the relocation offset (e.g., 15 bits encode 32 KW or 128 KB of shift). The RBT is allocated at startup time based on the maximum heap size. For example, on a system with 16 MB of memory, the RBT contains 128 entries, which consume 512 bytes. This may be the only space overhead for relocation.

To determine the relocation address of an object, the object's (shifted) original address is used as an index into the RBT, from which the relocation base address is loaded. The relocation address is then the sum of the base plus the offset.

As with the CPT, a one-element cache of RBT translations is used to reduce the number of RBT lookups.

One other issue that should be addressed is hash nursery overflow. It is possible in the process of compaction, that so many recently hashed objects are moved that the process of adding their hash codes to the hash nursery causes the nursery to overflow. If this happens, the first line of defense is to attempt to grow the hash nursery by requesting more space from the operating system. If this fails, the collector can simply stop compacting at that point (the compaction phase will complete, but only objects to the left of the one that would have overflowed the hash nursery are actually moved).

Using the above techniques, the object header during compaction may include a single word (e.g., a word consisting (from low to high bit positions) of 2 collector state bits, 1 hash bit, 14 class index bits, and 15 relocation offset bits).

In the exemplary aspects of the present invention, the class pointers may always be in low memory. Therefore, the class pointers may not actually be "compressed". Instead, the high 8 bits may be stolen for the relocation base table (RBT) offset. Therefore each RBT entry may correspond to 1 KB of memory (since it is used to represent a word offset), resulting in an RBT table space overhead of about 0.04%.

Mark-Coalesce-Compact

A variant of the mark-compact collector described above is a collector that avoids compaction by skipping compaction entirely if it discovers enough contiguous free space. In this exemplary aspect, compaction may be performed only when a large allocation request can not be satisfied with contiguous memory, or if excessive fragmentation is discovered. This technique has been used in a number of collectors.

While it seems like it could provide large speedups, since it eliminates half of the collection phases, it eliminates the two fastest phases, so the performance impact is not as dramatic as might be expected. Nevertheless, it provides a measurable improvement while introducing minimal additional complexity and code expansion, and is therefore worthwhile.

In fact, both the mark-compact and the mark-coalesce-compact collectors normally allocate into small thread-local chunks of memory. Otherwise, synchronization overhead would dominate the cost of allocation—causing roughly a 15% reduction in application throughput.

Therefore, the hand-coded assembly language allocation sequence attempts to allocate in the thread local area (typically I-4 kilobytes, depending on object size demographics and the level of multiprogramming). If a large object is requested, or if the thread local area is full, a call is made to the synchronized allocator.

These synchronization issues have a significant impact on collector design. In particular, it means that the mark-coalesce-compact collector can not directly re-use all of the recovered space that it finds, but only contiguous free chunks sufficiently large to amortize the synchronization cost. The tradeoffs in chunk size requirements versus collection frequency are being studied.

The inventors are also investigating the creation of thread-local chains of small objects—but that inevitably leads to a collector architecture more like the one described hereinbelow. However, such an optimization may be particularly important in very tight heaps, since the smaller the heap the smaller the average contiguous free region.

Paged Mark-Sweep-Defragment (PMSD)

The collector program may also include a PMSD collector which is a whole-heap, mark-sweep collector with optional defragmentation. In this collector, the heap is divided into 1 KB pages. Each page holds either meta-data that describes other pages, or application data.

In the inventors' configuration, 1.5% of the heap was dedicated to meta-data. Pages that hold application data are categorized as holding small data (objects less than 512 bytes) or large data. Each small-data page has an associated size class (chosen from one of 25 sizes ranging from 16 bytes to 512 bytes).

The page is sub-divided into blocks of the associated size. A small object is allocated into the smallest free block that will accommodate it. Large objects consume multiple contiguous pages. The type and state of each page is stored in its corresponding address-indexed meta-data structure.

At the end of each garbage collection, contiguous free pages are coalesced into contiguous block ranges. There are two block range lists, one for holding singleton blocks and one for multi-block ranges. During allocation, page requests that result from (small) free block exhaustion are preferentially satisfied from the singleton block list. For multi-page requests and failed single page requests, a first-fit search from the multi-block list is used.

Whenever the free list of a size is exhausted, the dead (hence, free) blocks of a small object page of the same size are linked together. The hatching allows most small object allocation to be fast. If all small object pages of the request size are used, a completely fresh page is requested. To avoid expensive atomic operations on the free list, each thread has its own free lists, which are created dynamically in response to application demand.

Each garbage collection begins with a mark phase where traversal of all reachable objects from the roots causes the mark bits of live objects to be set. The sweep phase then clears the mark bits of live objects and designates blocks containing unmarked objects as dead blocks. In this phase, the overall fragmentation of the system is computed. If the fragmentation exceeds a predetermine amount (e.g., 25%) or if the current allocation request is unsatisfiable due to fragmentation, defragmentation is triggered.

There are five sources of fragmentation in this scheme. If a small object's size does not exactly match an existing size class, the next larger size class is chosen. This resulting per-object wastage is called block-internal fragmentation. Since the page size 1 KB may not be a precise multiple of a size class, the end of each small object page may be wasted. This is called page-internal fragmentation. Perhaps the most important source of fragmentation is block-external fragmentation which results from partially used pages of small objects.

Consider, for example, a program that allocates enough objects of the same size to fill 10 pages of memory. If every other objects dies and the program then ceases to allocate objects of that size class, then half of the blocks in those pages will be wasted.

Page-external fragmentation can result from the allocation of multi-page objects that leave multi-page holes. If there is a multipage request is smaller than the sum of the holes but larger than a single hole, then the request will fail even though there are sufficient pages.

Finally, since using even a single block of a page forces the page to be dedicated to a particular size class, up to almost one page per size class can be wasted if that size class is only lightly used. In the worst case, the size-external fragmentation is the product of the page size and the number of size classes.

Page-internal fragmentation is eliminated by moving small objects from mostly empty pages to same-sized pages that are mostly full pages. Since there is no overlap of live and dead data, the forwarding pointer can be written in the class pointer slot without any compression. In some cases, page-level defragmentation is necessary to combat page-external fragmentation.

Currently, pages holding small objects can be relocated to empty pages by a block copy but there is no multi-page defragmentation support. This temporary shortcoming puts PMSD at a disadvantage for applications that make heavy use of large arrays.

Since in the present invention, size classes may be statically chosen, the size-external fragmentation can be severe for very small heaps. One solution is to choose size classes dynamically. At runtime, neighboring size classes are coalesced if the smaller size class is not heavily utilized. In this way, the slight increase in page-internal fragmentation can be more than offset by the decrease in size-external fragmentation.

Fewer size classes can also combat page-internal fragmentation. On the other hand, the same adaptive technique can create more size classes to densely cover size ranges where objects are prolific. In this case, more size classes will decrease block-internal fragmentation.

Single Word Object Header

Referring again to the drawings, FIGS. 4A-4E illustrate object models, requiring from 4 down to 1 word per object. Specifically, FIG. 4A illustrates an original object layout, FIG. 4B illustrates the object after forwarding compression, FIG. 4C illustrates the object after thin lock removal, FIG. 4D illustrates the object after hashcode compression, and FIG. 4E illustrates the object after hash state encoding.

Typical Java run-time environments use 3-word object headers: one word for the class pointer, one word containing a thin lock, and one word containing a hash code and garbage collector information. Furthermore, mark-compact collectors previously required an additional word to hold the forwarding pointer, which may only be used during garbage collection, as shown in FIG. 4A.

However, in an embedded environment, this profligate use of space is not acceptable.

Above, it was described how to eliminate the extra word for the forwarding pointer, resulting in the object model of FIG. 4B, which is also that used by the paged mark-sweep collector.

The inventors have shown in previous work, how the object header (without a forwarding pointer) can be compacted into a single word, at the cost of requiring a mask operation on the class pointer, or into two words at virtually no cost.

The optimizations can be briefly summarized as follows: the thin lock is removed from the object header and instead is treated as an optional field that is implicitly declared by the first synchronized method or synchronized (this) block that appears in the class hierarchy. The result is shown in FIG. 4C.

Since most objects are not synchronized, and virtually all objects that are synchronized have synchronized methods, this gives virtually the same performance as a dedicated thin lock in all objects, and yet only requires space in a very small number. A special case is instances of Object, which are provided with a thin lock since one of the only uses for such instances is to serve as a lock for synchronized blocks.

The Mash Table

In a collector that does not perform compaction, objects never move and the hash code can simply be implemented as a function of the object's address. However, compaction is important (e.g., a requirement) for embedded systems.

A previous work showed that the space for the hash code could be reduced to only two bits, by using the address of an unmoved object as its hash code. When an object whose hash code has been taken is moved, its original address is appended to the object and the hash function makes use of this value instead.

As a result, the extra state for each object is normally only 2 bits for the hash code and a few bits for the garbage collector state. If the collector state bits are sufficiently few, then class objects can be aligned on (for instance) 16-byte boundaries, providing 4 unused low bits in which to store object state. Then, to use a class pointer, the low bits must be masked out with an and immediate instruction. The result is shown in FIG. 4D.

However, this technique of hash code compression suffers from two significant disadvantages: (1) it consumes bits in the header word of each object, even though hash codes are rarely used. Furthermore, those bits are modified during execution and during garbage collection, which tends to complicate the implementation; (2) it causes objects to change size during their lifetime, which significantly complicates garbage collection. In the mark-compact collector, the forwarding pointer compression technique relies on the property that live objects in a range of memory will be compacted into an equally sized or smaller range of memory.

If objects can increase in size when they are moved, this is no longer true. In the paged mark-sweep collector, defragmentation is efficient because it is performed within a size class. If objects grow when moved, they may change size classes.

Therefore, rather than storing hash codes of moved objects at the end of the object, the hash codes are stored in a structure the inventors call the mash table. The mash table is a hash table of hash codes.

In short, the mash table has at least two advantages over other approaches. First, the mashtable requires zero bits in the object header. Secondly, objects never change size, which simplifies memory management significantly.

The mash table works as follows: when an object's Java hashCode( ) method is called, a hash value is computed based on its current address in storage. This is its hash index into the mash table. To avoid confusion, the inventors call this the object's mashcode.

If an entry whose key is the current address of the object is found, the corresponding value in the mashtable is returned as its hash code. If no entry for the object is found in the mashtable, a key/value pair is inserted where both the key and the value are the object's current address.

At garbage collection time, objects may move or die. Thus, garbage collection of the mashtable should be performed: references to dead objects are removed, and references to moved objects have their key field updated to the new address and are relocated in the mashtable based on the new mashcode. This may be done after marking and forwarding have been performed, but before actual relocation of objects.

The mashtable therefore allows for removal of all extra state from the object header, leaving only the garbage collector bits, as shown in FIG. 4E.

The only complication with the mashtable is that errors due to concurrent access to the mashtable by multiple threads should be prevented. On a uniprocessor, if the virtual machine only switches between Java threads at "safe points", then this is achieved by not having safe points in the mashtable code.

On a multiprocessor or in the absence of safe points, one can take advantage of the fact that obtaining the hash code is an idempotent operation (the hashcode of an object never changes, and its mashcode only changes during garbage collection, which is synchronized already). Therefore, one can have a small per-processor or per-thread cache of hashcode values, which allows for reducing the frequency of synchronization with the global mashtable to acceptable levels.

In a current implementation, the inventors have implemented the mashtable in C++ as a separate structure. However, in order to be robust in the face of pathological cases it is necessary to be able to resize the mashtable and collect unused mashtable entries. Trying to do this in a separate region of memory is complex, error-prone, and inefficient.

Therefore, in the next generation, the inventors intend to implement the mashtable in Java as a collection of private helper methods of java.lang.Object. This will include a helper method that can obtain the physical address of an object, and a helper method that is called by the system at the end of garbage collection to rehash the moved objects.

Reduction (e.g., Elimination) of Header Masking

The single-word object models of FIGS. 4D and 4E only contain a class pointer and a few state bits. Thus, when the system makes use of the class pointer (for virtual method dispatch or dynamic type tests), it must first mask off the low bits of the header word which are not part of the class pointer. This both slows down the code and increases the code size, due to the extra instruction.

However, after eliminating the hash code the only remaining object state bits are 1-3 bits for the garbage collector. As long as stop-the-world garbage collection is performed (as with both of our implemented collectors), the collection state bits are only used during the collection itself, and not during normal execution. Therefore, the state bits are zero during normal execution, and the masking operation can be eliminated.

Measurements

The inventors have implemented two basic collectors with a number of variants in terms of per-object space overhead and the associated run-time support. In this section we present an evaluation of our collectors using the Embedded Microprocessor Benchmark Consortium (EEMBC) Java GrinderBench benchmarks. The benchmarks are summarized in FIG. 5 which provides table illustrating programs in the Embedded Microprocessor Benchmark Consortium (EEMBC) Java GrinderBench suite.

The inventors have measured the collectors on two platforms: a Pentium based IBM Thinkpad and an ARM-based Sharp Zaurus. We refer to these configurations throughout the text as the IA32 and ARM configurations, respectively. Details of the measurement configurations are shown in the table provided in FIG. 6.

Both configurations use a bytecode interpreter with a lightweight JIT compiler that compiles frequently executed methods. The JIT compiler performs a moderate amount of optimization, since more optimization requires both more RAM at run-time and more ROM for the optimizing compiler. Infrequently executed methods are interpreted to conserve space and reduce JIT overhead.

The inventors began by evaluating the effect of the space optimizations on collector-independent characteristics. These are shown in FIG. 7 which provides a table illustrating the effect of header compression on heap consumption for header sizes from 4 to 1 words. An effect on both total allocated data as well as on maximum live heap size are shown in FIG. 7.

The first three columns give a general picture of the allocation behavior of each benchmark: the total number of objects allocated, and the allocation rate in both objects/second and megabytes/second (the latter two figures are for our most efficient collector (MC.1) run with a heap twice the size of maximum live memory on the ARM).

For each per-object overhead, from the original 4 words for MC down to 1 word, the inventors showed the effect on both total allocated bytes and on the maximum live data size. The first thing to notice is that reducing the header size can have a dramatic effect on the total bytes allocated (a 40% reduction for Chess and a 30% reduction for kXML).

However, the effect on maximum live memory is considerably less (15% and 21% respectively). This indicates that the average size of long-lived objects is larger than the average size of all allocated objects, which is not surprising.

Furthermore, there is enormous variation in the allocation rates: kxML allocates over 50 times as much data as RegExp. There is also considerable variation in the maximum live memory size: kxML has almost 7 times larger maximum live memory than Chess.

However, there is no correlation between allocation rate and maximum live memory: Chess has the smallest maximum live memory but allocates only slightly slower than kXML. This issue is actually quite important when deciding how to evaluate the performance of collectors with respect to different benchmarks, since one can normalize to either maximum live memory or to allocation rate, and a compelling case can be made for both measures.

Performance

Further, several variants of the two collectors were measured by the inventors: the mark-compact (MC) collector and the paged mark-sweep-defragment (PMSD) collector. The initial per-object overhead in the MC collector was 4 words: a 3-word header plus an additional word for the forwarding pointer. Forwarding pointer compression, thin lock removal, and the mash table, were implemented which allowed the inventors to reduce the per-object overhead for each collector to only 1 word.

Due to details of the IBM J2ME implementation, there were extra read-only state bits kept in the object header which the inventors did not remove; therefore, in configurations using the one-word header, every access to the class pointer includes an additional AND instruction to mask the low bits. This slows down virtual function dispatch, class tests, and down-casting. However, this penalty is offset by the fact that the one-word header also has a simpler allocation sequence, so new operations are faster.

The software configurations are named MC.4 through MC.1 for the mark-compact collector with the corresponding header sizes, and PMSD.3 through PMSD.1 for the paged mark-sweep-defragment collector. The collectors are measured at heap sizes from 1 to 5 times their maximum live memory (which is also the minimum heap size in which they can run). For brevity, when the term "heap size 2" is used, it should be understood to mean "heap size of 2 times the maximum live data size for this application".

The inventors began by examining the effect of garbage collection on absolute, end-to-end performance, as shown in FIGS. 8A-8F (for ARM) and FIGS. 9A-9F (for IA32). Specifically, FIGS. 8A-8F illustrate end-to-end execution time (ARM). Speed in relative to the best collector (mark-compact with one-word headers, or MC.1) at a heap size of two times the maximum live data.

FIGS. 9A-9F illustrate the end-to-end execution time for IA32. The inventors focused on the ARM measurements, since such measurements are much more relevant for embedded systems.

The figures are normalized with respect to the performance of the mark-compact collector with a 1-word header (MC.1) run with heap size 2. The inventors chose this configuration as their baseline because MC.1 generally gives the best performance, and heap size 2 is large enough to get past the "knee" in the performance curve.

In general, the mark-compact (MC) collector consistently outperforms the paged mark-sweep-defragment (PMSD) collector, in both speed and in its ability to run in very small heaps (below heap size 2). The speed differential is even larger on the ARM than on the IA32 configuration. The reasons for these differences are examined in greater detail hereinbelow.

The benchmarks can be characterized in 3 groups: high, medium, and low collector loads.

The high-load benchmarks are kXML and Chess. Both allocate at a high rate, both in terms of MB/second and objects/second, and both allocate a large amount of total data. However, while kXML has the largest maximum live heap size (224 KB with 1-word headers), Chess has the second smallest maximum live heap size (only 32 KB).

This leads to an interesting question: should base performance measurements of applications be based on their maximum live data size, or on their allocation? While Chess appears to be the worst performing benchmark in FIG. 3, it must be noted that at heap size 5, the absolute heap size is only 160 KB, which would correspond to heap size 0.7 for kXML—it could not even run!

On the one hand, it hardly seems fair to penalize an application for minimizing its maximum live heap size—to get a better "score", all a programmer would need to do would be to insert a large unused static array. On the other hand, it is important to know how well a program will run at its limits, since this mode of operation is expected to occur more frequently on embedded devices than otherwise. In the end, developers and evaluators must be aware of the distinction and carefully consider their metrics.

The medium-load benchmarks are PNG and Crypto: they each have similar (modest) allocation rates, maximum live memory, and total allocated bytes. They achieve excellent performance: with a heap size of only 1.3 (for PNG) and 1.25 (for Crypto), they achieve over 85% of the performance at heap size 5. Both medium load programs perform about 1000 garbage collections at these heap sizes. Because the heaps are small and the collector is efficient, this does not impose a very large penalty on the application.

Finally, the low-load programs, Parallel and RegExp, have almost no collector overhead: even with a relative heap size of only 1.05, they achieve over 90% of peak performance. For RegExp, this is easy to understand because it allocates very slowly-almost ten times more slowly than the next slowest allocating benchmark (Parallel). However, Parallel allocates at about the same rate as Crypto, which is quite memory-sensitive below heap size 2.

Once again, the reason is the difference in absolute scale: the maximum live heap size of Parallel is almost exactly 3 times as large as that of Crypto. Therefore, the graph for Crypto is simply providing much higher resolution near the point of failure. In particular, for programs with the same allocation rate, a collection will be triggered each time they allocate the difference between their live heap size and the actual heap size. Assuming that the live heap size is proportional to the maximum live heap size, this means that the program with the larger live heap will appear to have better performance near the asymptote, although in fact there is no difference.

Mark-Compact vs. Paged Mark-Sweep

The mark-compact collector consistently out-performs the paged mark-sweep collector and is able to run in much smaller heaps, as can be seen in FIGS. 8A-8F and FIGS. 9A-9F. It is important to understand these performance differences since for server systems, the situation is usually reversed.

Mark-compact has a large advantage in that it is simpler in numerous dimensions. Fundamentally, it uses a much simpler heap organization, in which objects are simply allocated one after another in the heap. As a result, there is no fragmentation, almost no metadata, and the allocation operation is simpler. Furthermore, since there is no need to manage multiple size classes and block metadata, the collector is simpler, resulting in simpler and more compact code, and fewer invariants. Finally, since objects are always allocated contiguously and compacted in the same order, locality is generally better.

PMSD does not handle external fragmentation caused by multi-page objects, which results in an inability to run in tight heaps. This is expected to improve considerably based on the inventors' previous experience with a similar architecture in a Metronome collector.

In general, the PMSD collector often fails at heap size 2 or even larger, while the MC collector is able to run down to the limit of the maximum live data size.

To analyze how fragmentation causes failure, each benchmark was run at the largest heap size where it fails to run and based on the failing allocation request evaluated what types of fragmentation caused the failure. This depends on the benchmark and there are two failure modes.

The first failure mode is one in which there are too many size classes, which leads to excessive size fragmentation. RegExp and Chess fall into this category.

The second failure mode is due to the lack of multi-page defragmentation. The other four benchmarks fail when attempting to allocate objects between 10 KB and 36 KB.

Figure 10B:
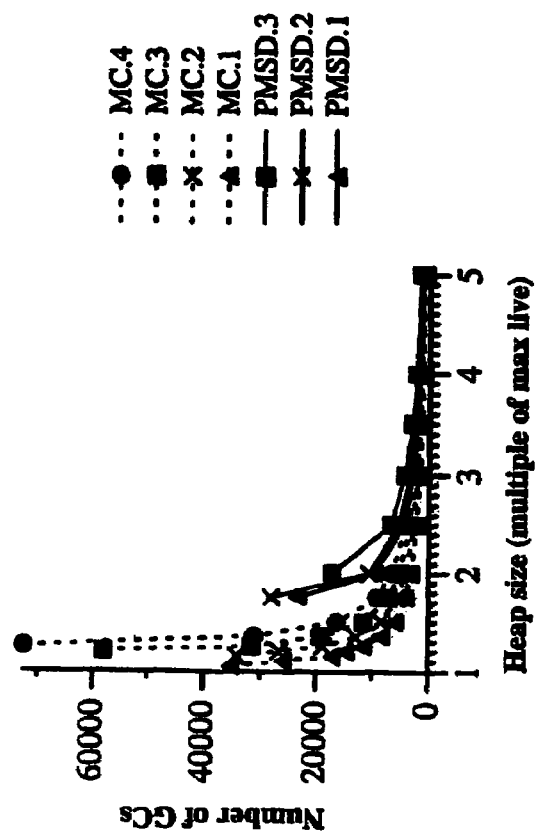
FIGS. 10A-10B illustrate performance details on the ARM for mutator speed and number of garbage collections for measurements performed by the inventors.
Figure 10A:
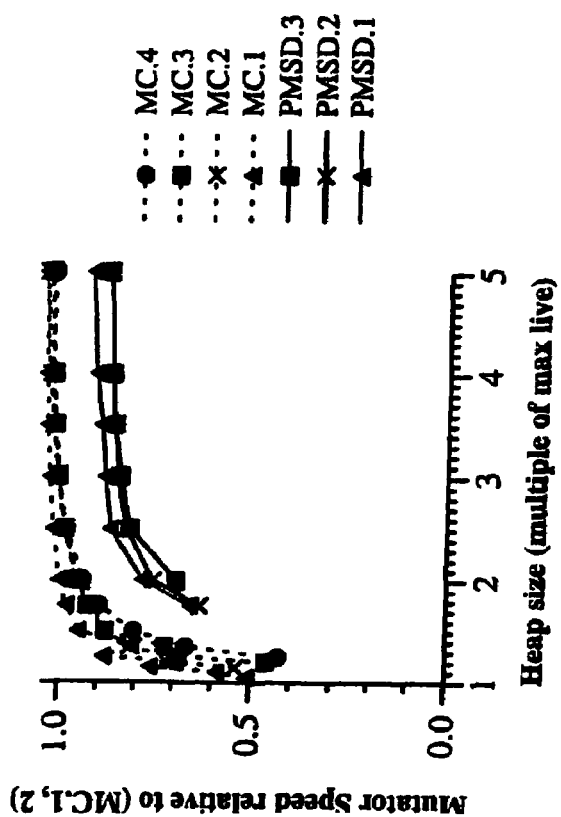

FIGS. 10A-10B illustrate the results for the chess benchmark. Performance details on the ARM are provided for mutator speed (FIG. 10A) and number of garbage collections (FIG. 10B).

Figure 11B:
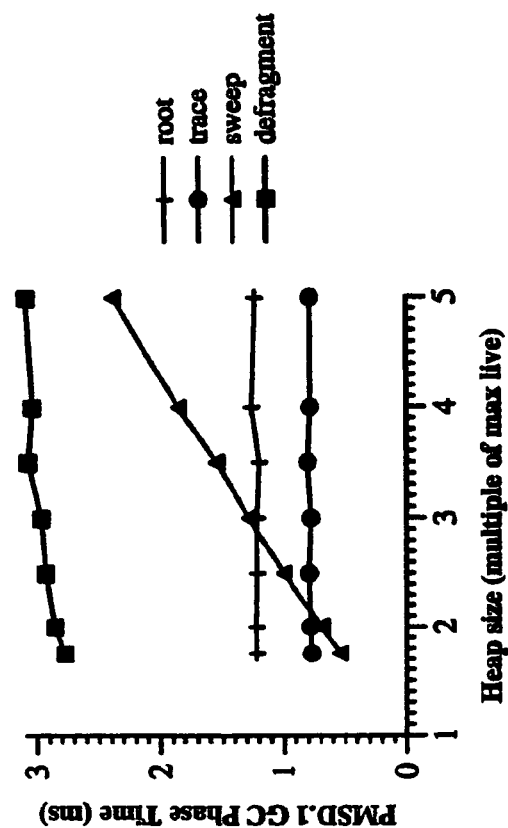
FIGS. 11A-11B illustrate collector phase times on the ARM for mark-compact and paged mark-sweep collectors for measurements performed by the inventors.
Figure 11A:
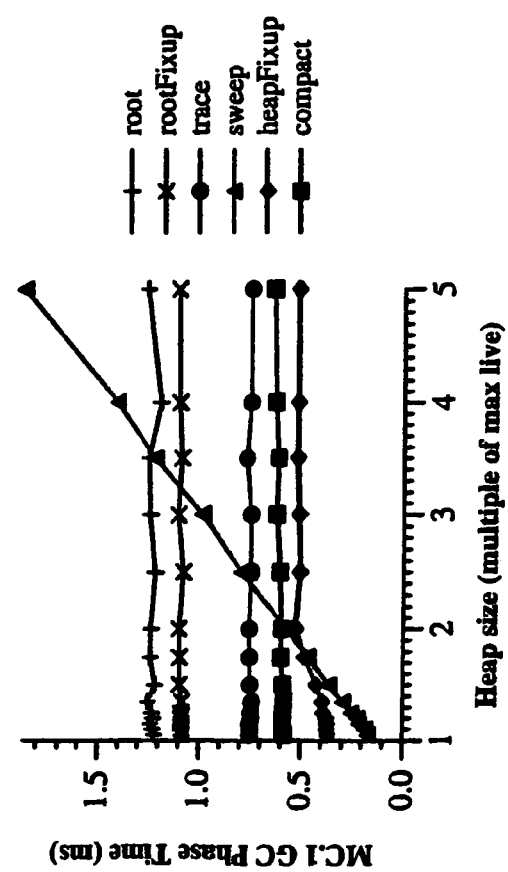

FIGS. 11A-11B further illustrate the results for the chess benchmark. Garbage collector phase times on the ARM are provided for mark-compact (FIG. 11A) and paged mark-sweep (FIG. 11B).

Specifically, FIGS. 10A and 10B show time spent in mutator code, exclusive of garbage collection. However, this does not exclude allocation, which is performed by the mutators. These graphs therefore allow us to evaluate the effect of the allocation strategy on performance.

It is immediately obvious that the allocator used by MC, which is a simple bump pointer allocator, is far superior to that used by PMSD. There are a number of reasons for this, some of them correctable. First of all, since the allocation in PMSD is more complex, it actually calls a C function rather than being implemented directly in assembler, which adds 10 instructions to the allocation sequence.

Second, for most allocation sites (except for arrays with variable initial sizes) we know the size class of the object being created, and could select the size class at compile-time. However, the inventors have not yet implemented this optimization which is expected to yield a modest improvement.

Finally, the allocation sequence for PMSD is just inherently more complex. In the inventors' implementation of the Jikes RVM, the fully optimized allocation sequence for a bump pointer was 11 instructions, while for a segregated free list it was 18 instructions.

FIGS. 11A and 11B show the cost of the individual collector phases for both MC and PMSD (note that the organization of graphs is different than previously, since the inventors separate the two collectors onto different graphs). These graphs show the real-world impact of the difference in theoretical complexity between the sweep phase and the other phases of collection: sweep is O(heap), while the other phases are O(live).

As a result, the sweep phase completely dominates collection time at large relative heap sizes; at small relative heap sizes it is similar or even less than the time required by the other phases.

Figure 12:
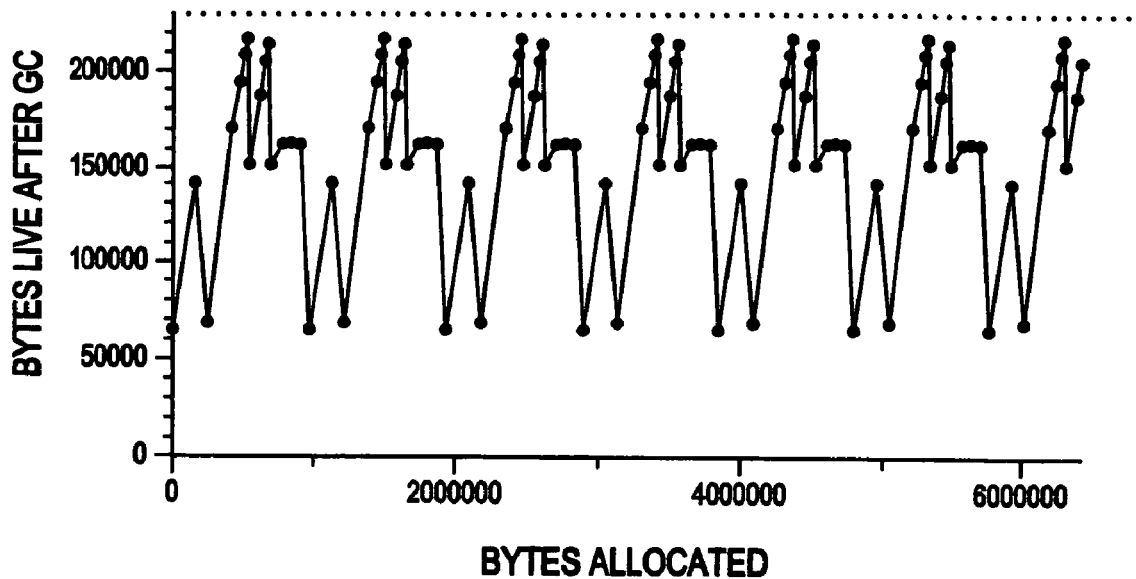
FIG. 12 is a graph plotting allocation vs. live data in kXLM (first 100 collections), for measurements performed by the inventors.

FIG. 12 is a graph plotting allocation vs. live data in kXLM (first 100 collections). The data in FIG. 12 point to a strange anomaly: for kxML and most of the other benchmarks, the number of collections drops in a smoother curve, and the implementations with smaller object sizes have a curve that is uniformly lower than the curves of the same collector with larger object sizes.

However, for PNG the curves cross back and forth and sometimes intersect—meaning that at certain heap sizes, the same number of collections are performed even though the number of bytes allocated is different. At first, the inventors suspected a bug in the collector or in their measurements.

However, this is in fact a symptom of a behavior mode which the inventors have hypothesized but never previously seen empirical evidence of: the number of collections is non-monotonic because of varying live data in the application.

Essentially, one can think of some applications as having a "resonant frequency" for garbage collection. When the collector is in phase with the resonant frequency, performance is good, because the collections happen when the amount of live data is low. When the collector is out of phase with the application, performance is bad, because the collector repeatedly triggers when live memory is high, meaning that little memory is reclaimed and another collection takes place very soon.

Thus, the inventors have implemented and empirically assessed variants of two garbage collectors specifically designed for the unique requirements of small embedded devices. An important part of making these collectors efficient was developing algorithmic improvements and compression techniques that allow us to eliminate almost all of the per-object overhead that the virtual machine and garbage collector traditionally require.

For embedded applications, the mark-compact algorithm is clearly superior to the paged mark-sweep algorithm: it is almost uniformly faster, runs in significantly smaller heaps, and consumes only half as much code space. While true for both the laptop and PDA device, the speed differential is significantly higher on the PDA, suggesting that the greater inherent complexity of the paged marks-weep algorithm is a poor match to an embedded CPU, with its simpler instruction set architecture, shallower pipelines, and reduced instruction-level parallelism.

The inventors' new techniques for object metadata compression require only a single word of metadata per Java object, even for the mark-compact algorithm which previously always required an extra word to allow for object relocation during garbage collection. Smaller objects mean a lower allocation rate, a smaller maximum live data set size, and a larger effective cache size. These properties result in higher performance and lower heap size requirements.

However, these benefits are not without cost: the more tightly packed the object metadata, the less redundancy and the more complex the invariants that must be maintained. As a result, there is a noticeable cost in reliability, testing, and maintenance requirements. However, these costs are likely to be worth paying on virtual machines with a large installed base in memory-limited devices, such as cellular phones, smart cards, and sensors.

For applications with low to moderate allocation rates, the inventors' optimized mark-compact collector is able to achieve 85% of peak performance with only 1.05 times the absolute minimum heap size. For applications with high allocation rates, the collector achieves 85% of peak performance with 1.5 to 2 times the minimum heap size. The collector code requires only 40 KB of ROM, and collector metadata overhead has been almost completely eliminated, consuming only 0.4% of the heap.

Figure 13:
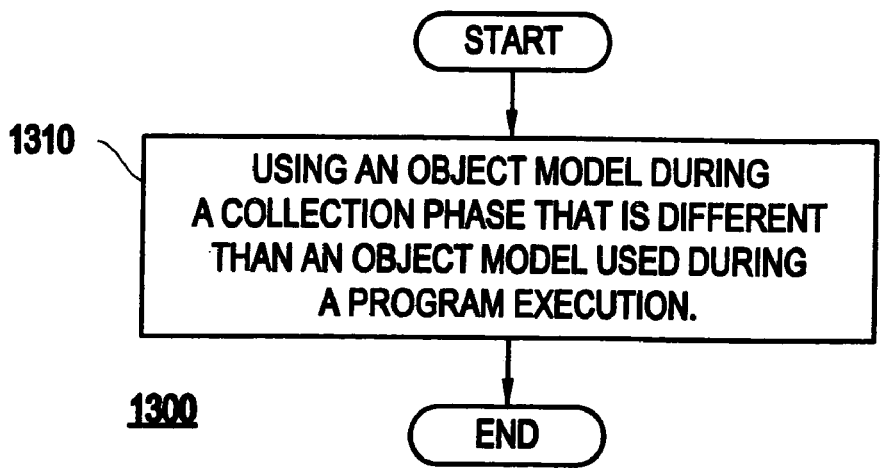
FIG. 13 is a flowchart illustrating a method 1300 of collection in a system (e.g., an embedded system), according to the exemplary aspects of the present invention.

Referring again to the drawings, FIG. 13 is a flowchart illustrating a method 1300 of collection, according to the exemplary aspects of the present invention. The method 1300 includes using (1310) an object model during a collection phase that is different than an object model used during a program execution. The method may also (e.g., alternatively) include assigning a hash code to at least some objects, and consulting a structure that maintains a mapping of objects to hashcode values to determine said hashcode for one of said objects. The method may also (e.g., alternatively) include storing a class pointer and garbage collector state information in a single word, and accessing said class pointer by masking out non-class bits.

Figure 14:
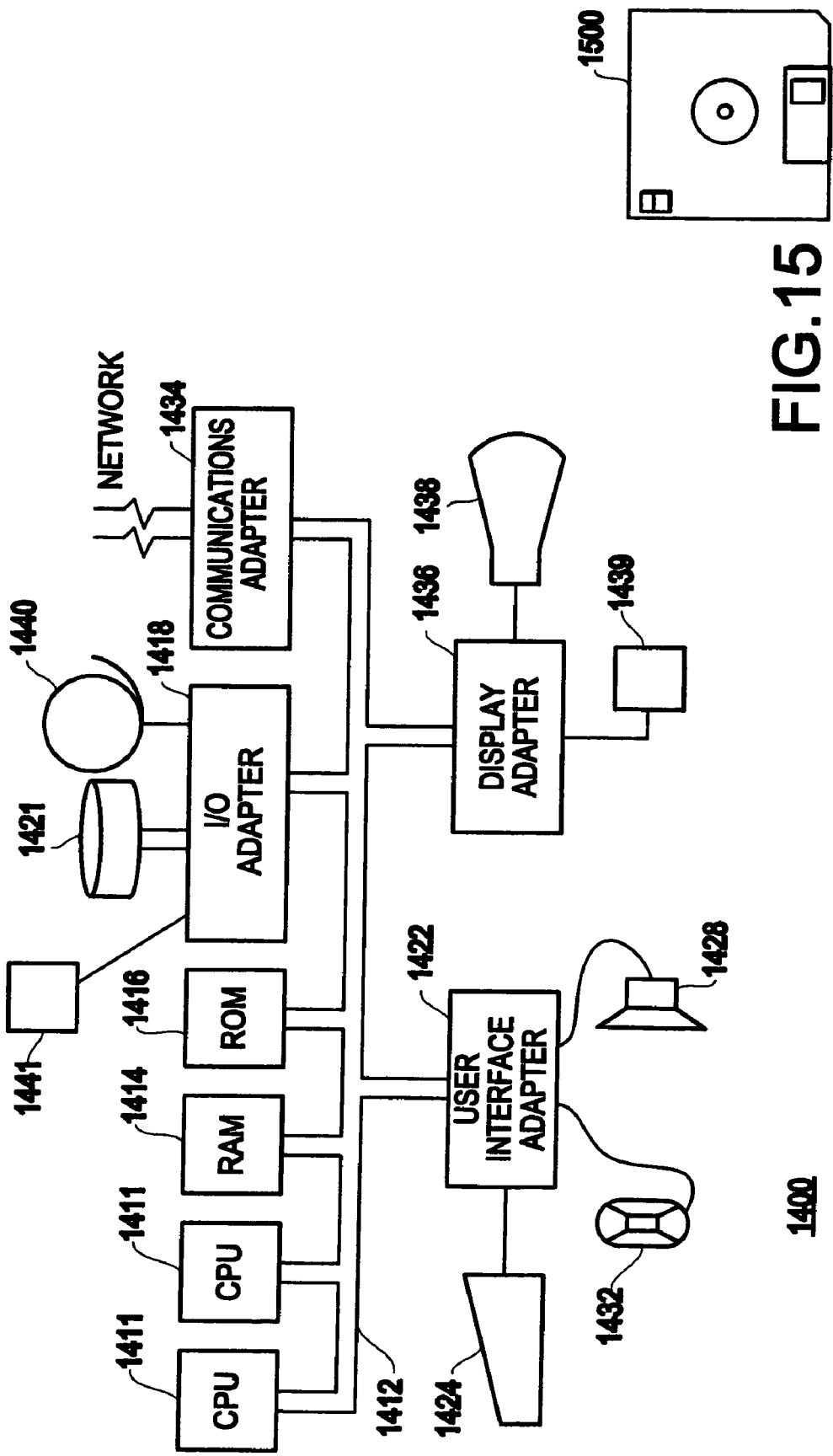
FIG. 14, illustrates a typical hardware configuration 1400 which may be used to implement the exemplary aspects of the present invention.

FIG. 14, illustrates a typical hardware configuration 1400 which may be used to implement the present invention.

The configuration has preferably at least one processor or central processing unit (CPU) 1411. The CPUs 1411 are interconnected via a system bus 1412 to a random access memory (RAM) 1414, read-only memory (ROM) 1416, input/output (I/O) adapter 1418 (for connecting peripheral devices such as disk units 1421 and tape drives 1440 to the bus 1412), user interface adapter 1422 (for connecting a keypad 1424, speaker 1428, microphone 1432, and/or other user interface device to the bus 1412), a communication adapter 1434 for connecting an information handling system to a data processing network, the Internet, and Intranet, a personal area network (PAN), etc., and a display adapter 1436 for connecting the bus 1412 to a display device 1438 and/or printer 1439. Further, an automated reader/scanner 1441 may be included.

In addition to the system described above, a different aspect of the invention includes a processor (e.g., microprocessor) implemented method for performing the above method. As an example, this method may be implemented in the particular environment discussed above.

Such a method may be implemented, for example, by operating a processor (e.g., embedded system including a microprocessor), as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 1411 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 1411 and hardware above, to perform the method of the invention.

Figure 15:
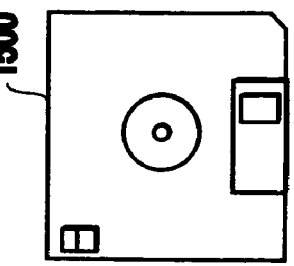
FIG. 15 illustrates an exemplary programmable storage medium tangibly embodying a program of machine-readable instructions executable by a digital processing apparatus to perform a method of collection, according to the exemplary aspects of the present invention.

This signal-bearing media may include, for example, a RAM contained within the CPU 1411, as represented by the fast-access storage for example. Alternatively, the instructions may be contained in another signal-bearing media, such as a magnetic data storage diskette 1500 (FIG. 15), directly or indirectly accessible by the CPU 1411.

Whether contained in the computer server/CPU 1411, or elsewhere, the instructions may be stored on a variety of machine-readable data storage medium such as DASD storage (e .g, a conventional "hard drive"), magnetic tape, electronic read-only memory (e.g., ROM, EPROM, or EEPROM), an optical storage device (e.g., CD-ROM, WORM, DVD, digital optical tape. Transmission media includes other suitable signal-bearing media including transmission media such as digital and analog and communication links and wireless. In an illustrative embodiment of the invention, the machine-readable instructions may comprise software object code, complied from a language such as C+, C++ etc.

With its unique and novel features, the present invention provides a system, method and program for representation of objects which is more space-efficient than conventional systems, methods and programs.

While the invention has been described in terms of one or more embodiments, those skilled in the art will recognize that the invention can be practiced with modification within the spirit and scope of the appended claims. Specifically, one of ordinary skill in the art will understand that the drawings herein are meant to be illustrative, and the design of the inventive assembly is not limited to that disclosed herein but may be modified within the spirit and scope of the present invention.

Further, Applicant's intent is to encompass the equivalents of all claim elements. No amendment to any claim in the present application should be construed as a disclaimer of any interest in or right to an equivalent of any element or feature of the amended claim.

What is claimed is:

1. A system comprising:
a memory which stores plural objects and is divided into plural pages, a page in said plural pages comprising a relocation base table (RBT) which is allocated at startup time based on a maximum heap size; and
a processor for executing a collector program to perform collection on said plural objects by:
encoding a class pointer of an object header for an object of said plural objects with a class index which comprises a class page table index and a class page offset and storing said class pointer in class page table;
storing a relocation address for a first live object of said plural objects in the relocation base table (RBT), and storing a relocation offset in the object header,
the relocation address for said object being given as a sum of a relocation base address for said object plus said relocation offset; and
storing a hashcode of said object in a mashtable which maintains a mapping of said plural objects to hashcode values which are computed based on a current address for said plural objects, said hashcode values being a hash index of said plural objects into said mashtable, said storing comprising:
if an entry is found and a key of the entry is the current address of said object, returning a corresponding value in the mashtable as said hashcode for said object, and
if no entry for the object is found in the mashtable, inserting a key/value pair where the key and the value are a current address for said object;
wherein after the object in said plural objects is determined to be live, and before any object is relocated, collection is performed on said mashtable such that a reference to a dead object is removed, and a key field for a moved object is undated to a new address and is relocated in the mashtable based on a new hashcode.

2. The system according to claim 1, wherein available space in said object header is used for said relocation offset.

3. The system according to claim 1, wherein no bits in a header of an object in said plural objects encode a hashcode state for said object.

4. The system according to claim 3, wherein one bit in said header of said object encodes whether a mashtable entry exists for said object.

5. The system according to claim 1, wherein said processor consults said mashtable to determine said hashcode for one of said plural objects.

6. The system according to claim 5, wherein said object header comprises a class pointer and garbage collector state information in a single word.

7. The system according to claim 6, wherein said processor accesses said class pointer by masking out non-class bits.

8. The system according to claim 1, wherein said object header during said collection is different than said object header during program execution.

9. A system comprising:
a memory which stores plural objects and is divided into plural pages, a page in said plural pages comprising a relocation base table (RBT) which is allocated at startup time based on a maximum heap size; and
a processor which executes a program to perform collection on said plural objects by:
encoding a class pointer of an object header for an object of said plural objects with a class index which comprises a class page table index and a class page offset and storing said class pointer in a class page table;
storing a relocation address for a first live object of said plural objects in the relocation base table (RBT), and storing a relocation offset in the object header, the relocation address for said object being given as a sum of a relocation base address for said object plus said relocation offset; and
eliminating all extra state from said object header by storing a hashcode of said object in a mashtable which maintains a mapping of said plural objects to hashcode values which are computed based on a current address for said plural objects, said hashcode values being a hash index of said plural objects into said mashtable, said storing comprising:
if an entry is found and a key of the entry is the current address of said object, returning a corresponding value in the mashtable as said hashcode for said object, and
if no entry for the object is found in the mashtable, inserting a key/value pair where the key and the value are a current address for said object;
wherein after the object in said plural objects is determined to be live, and before any object is relocated, collection is performed on said mashtable such that a reference to a dead object is removed, and a key field for a moved object is undated to a new address and is relocated in the mashtable based on a new hashcode.

10. The system according to claim 9, wherein said mashtable is consulted when a hashCode method for an object in said plural objects is called.

11. A system comprising:
a memory which stores plural objects and is divided into plural pages, a page in said plural pages comprising a relocation base table (RBT) which is allocated at startup time based on a maximum heap size;
a processor for executing a program to perform collection on said plural objects by:
storing a class pointer and garbage collector state information in a single word, comprising:
encoding a class pointer of an object header for an object of said plural objects with a class index which comprises a class page table index and a class page offset and storing said class pointer in class page table;
storing a relocation address for a first live object of said plural objects in the relocation base table (RBT), and storing a relocation offset in the object header, the relocation address for said object being given as a sum of a relocation base address for said object plus said relocation an offset; and
eliminating all extra state from said object header by storing a hashcode of said object in a mashtable which maintains a mapping of said plural objects to hashcode values which are computed based on a current address for said plural objects, said hashcode values being a hash index of said plural objects into said mashtable, said storing comprising:
if an entry is found and a key of the entry is the current address of said object, returning a corresponding value in the mashtable as said hashcode for said object, and
if no entry for the object is found in the mashtable, inserting a key/value pair where the key and the value are a current address for said object;
wherein after the object in said plural objects is determined to be live, and before any object is relocated, collection is performed on said mashtable such that a reference to a dead object is removed, and a key field for a moved object is undated to a new address and is relocated in the mashtable based on a new hashcode.

12. The system according to claim 11, wherein garbage collector state bits are represented such that said garbage collector state bits comprise 0 when said collection is not in progress.

13. The system according to claim 11, wherein said class pointer is accessed without masking when said collection is off.

14. A method of collection, comprising:
storing plural objects in a memory which is divided into plural pages, a page in said plural pages comprising a relocation base table (RBT) which is allocated at startup time based on a maximum heap size; and
executing a program by a processor to perform collection on said plural objects, said collection comprising:
encoding a class pointer of an object header for an object of said plural objects with a class index which comprises a class page table index and a class page offset and storing said class pointer in class page table;
storing a relocation address for a first live object of said plural objects in the relocation base table (RBT), and storing a relocation offset in the object header, the relocation address for said object being given as a sum of a relocation base address for said object plus said relocation offset; and
eliminating all extra state from said object header by storing a hashcode of said object in a mashtable which maintains a mapping of said plural objects to hashcode values which are computed based on a current address for said plural objects, said hashcode values being a hash index of said plural objects into said mashtable, said storing comprising:
if an entry is found and a key of the entry is the current address of said object, returning a corresponding value in the mashtable as said hashcode for said object, and
if no entry for the object is found in the mashtable, inserting a key/value pair where the key and the value are a current address for said object;
wherein after the object in said plural objects is determined to be live, and before any object is relocated, collection is performed on said mashtable such that a reference to a dead object is removed, and a key field for a moved object is undated to a new address and is relocated in the mashtable based on a new hashcode.

15. The method according to claim 14, further comprising:
storing said class pointer and garbage collector state information in a single word of said object header; and
accessing said class pointer by masking out non-class bits.

16. A programmable storage medium tangibly embodying a program of machine-readable instructions executable by a digital processing apparatus to perform a method of collection, said method comprising:

storing plural objects in a memory which is divided into plural pages, a page in said plural pages comprising a relocation base table (RBT) which is allocated at startup time based on a maximum heap size; and executing a program to perform collection on said plural objects, said collection comprising:

encoding a class pointer of an object header for an object of said plural objects with a class index which comprises a class page table index and a class page offset and storing said class pointer in a class page table;

storing a relocation address for a first live object of said plural objects in the relocation base table (RBT), and storing a relocation offset in the object header, the relocation address for said object being given as a sum of a relocation base address for said object plus said relocation offset; and eliminating all extra state from said object header by storing a hashcode of said object in a mashtable which maintains a mapping of said plural objects to hashcode values which are computed based on a current address for said plural objects, said hashcode values being a hash index of said plural objects into said mashtable, said storing comprising:

if an entry is found and a key of the entry is the current address of said object, returning a corresponding value in the mashtable as said hashcode for said object, and if no entry for the object is found in the mashtable, inserting a key/value pair where the key and the value are a current address for said object;

wherein after the object in said plural objects is determined to be live, and before any object is relocated, collection is performed on said mashtable such that a reference to a dead object is removed, and a key field for a moved object is updated to a new address and is relocated in the mashtable based on a new hashcode.

17. The programmable storage medium according to claim 16, wherein said method further comprises:

storing said class pointer and garbage collector state information in a single word of said object header; and accessing said class pointer by masking out non-class bits.

\* \* \* \* \*